June 4, 1957 E. J. WILLIS 2,794,685
FISH PUMP

Filed Oct. 21, 1954 3 Sheets-Sheet 1

INVENTOR.
Elijah J. Willis
BY Victor J. Evans & Co.
ATTORNEYS

June 4, 1957 E. J. WILLIS 2,794,685
FISH PUMP
Filed Oct. 21, 1954 3 Sheets-Sheet 2
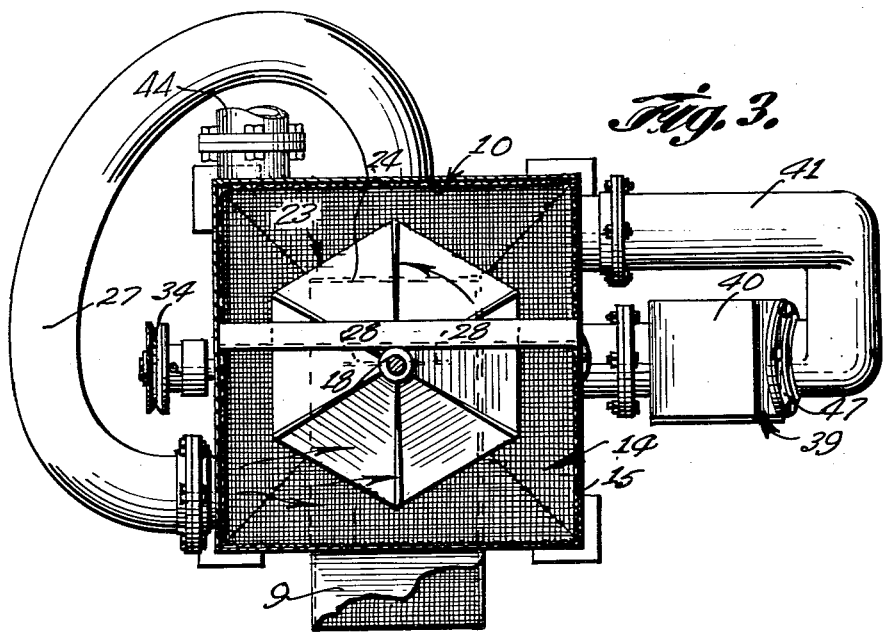
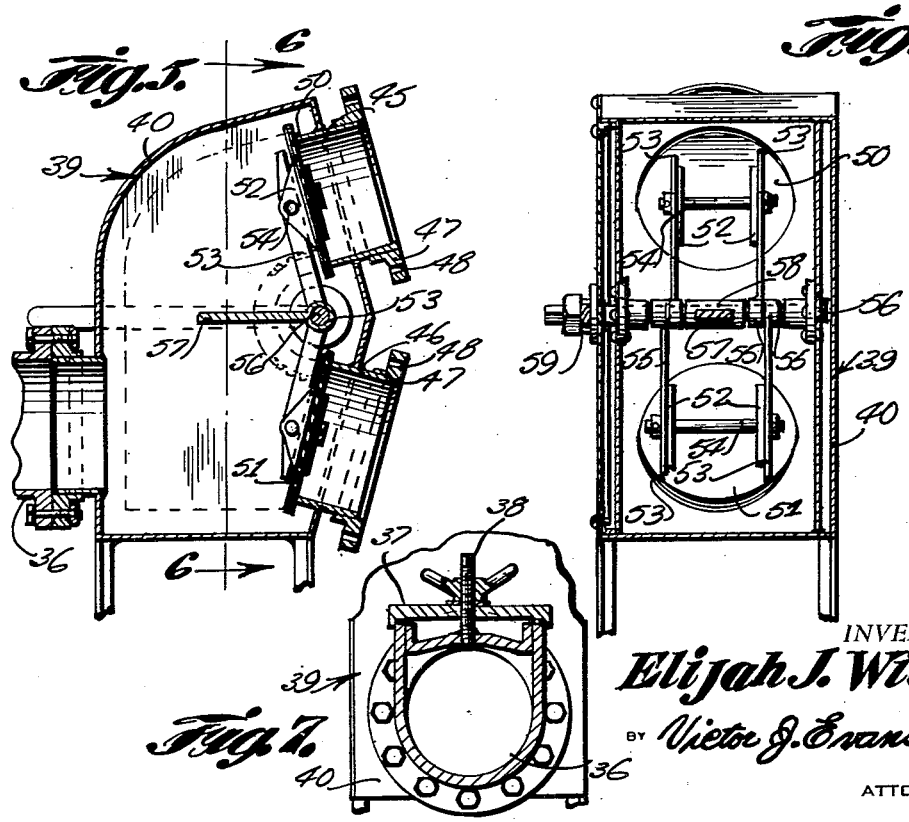
INVENTOR.
Elijah J. Willis
BY Victor J. Evans & Co.
ATTORNEYS June 4, 1957  E. J. WILLIS  2,794,685
FISH PUMP
Filed Oct. 21, 1954  3 Sheets-Sheet 3
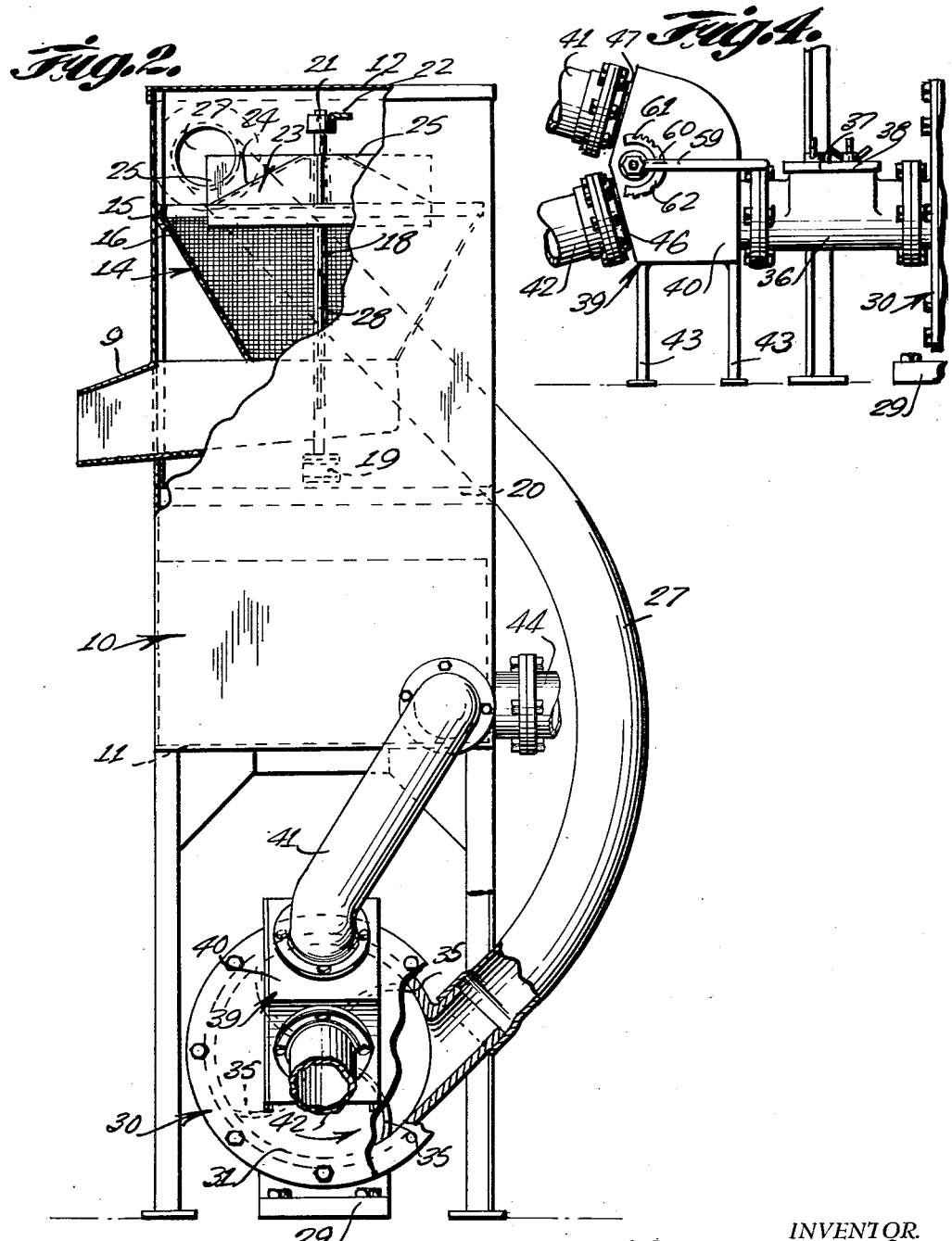
INVENTOR.
Elijah J. Willis
BY Victor J. Evans & Co.
ATTORNEYS United States Patent Office 2,794,685
Patented June 4, 1957

2,794,685
FISH PUMP

Elijah J. Willis, Morehead City, N. C.

Application October 21, 1954, Serial No. 463,774

3 Claims. (Cl. 302—14)

This invention relates to pumping equipment particularly adapted for elevating fish from nets in the water and at the side of a boat to containers on the boat, with excess water draining back into the sea and with the fish removed by screens or strainers in the container, and in particular this invention includes a by-pass in pumping equipment for this purpose wherein upon moving the suction nozzle from one net to another an auxiliary nozzle is opened whereby the pump continues to operate without losing the water head and consequently continuous priming of the pump as the suction nozzle is moved from one net to another is eliminated.

The purpose of this invention is to obviate the necessity of stopping and starting a hydraulic pump used for elevating fish from a net to a container whereby the time ordinarily lost in priming is utilized for pumping.

The conventional type of pumping equipment used on fishing boats for removing fish from nets with the nets in the water is comparatively inefficient because it is necessary to stop the pump as the suction nozzle is moved from one net to another or as the head is broken upon movement of the suction nozzle above the surface of the water and this requires priming the pump each time the operation is continued.

The object of this invention, is therefore, to provide means for forming a fish pump whereby the pump may operate continuously as the suction nozzle thereof is elevated above the surface of the water and moved from one net to another.

A further object of the invention is to provide improved fish pumping equipment for fishing boats wherein a pump operates continuously, in which the equipment is of simple and economical construction.

A further object of the invention is to provide a fish pump which is extremely simple and inexpensive to manufacture.

Other objects and advantages will be apparent during the course of the following description.

In the accompanying drawings, forming a part of this application, and in which like numerals are used to designate like parts throughout the same:

Figure 2 is a front elevational view of the fish pump, with parts broken away and in section.

Figure 3 is a sectional view taken on the line 3—3 of Figure 1.

Figure 4 is a side elevational view of the valve mechanism.

Figure 5 is a vertical sectional view taken through the valve mechanism of Figure 4.

Figure 6 is a sectional view taken on the line 6—6 of Figure 5.

Figure 7 is a sectional view taken on the line 7—7 of Figure 1.

Figure 1:
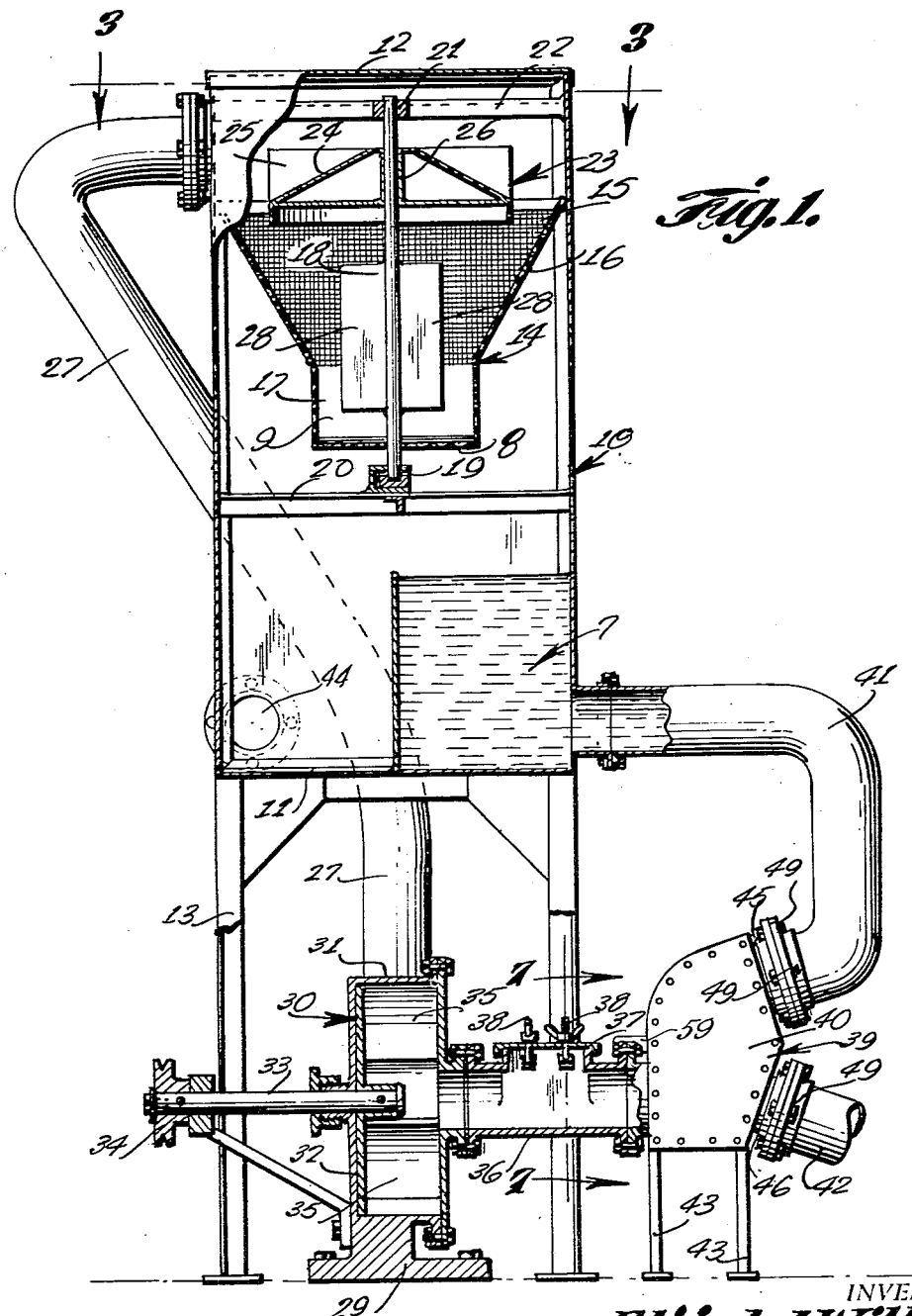
Figure 1 is a side elevational view of the fish pump, constructed according to the present invention, and with parts broken away and in section.

Referring in detail to the drawings, the numeral 10 designates a hollow housing which may be supported on vertically disposed spaced parallel legs 13, Figures 1 and 2, and the housing 10 includes a horizontally disposed bottom wall 11. A cover or lid 12 may be detachably mounted on top of the housing 10 and the cover 12 may be removed when access is to be gained to the interior of the housing.

Positioned in the upper portion of the housing 10 is a filter 14 which can be made of any suitable reticulated material such as wire screen, and the filter 14 includes an upper frusto-conical portion 16 that may be secured to the housing 10 by a bracket 15. The filter 14 further includes a lower portion 17 of reduced size and the lower portion 17 of the member 14 has communicating therewith a discharge spout 9, Figure 2, whereby the fish is discharged therefrom. A screen or reticulated member 8 may be positioned at the bottom of the element 14, whereby a portion of the circulating water will discharge into a chamber or compartment 7 for a purpose to be later described.

Rotatably mounted in the upper portion of the housing 10 is a shaft 18, and the lower end of the shaft 18 is supported by a bearing 19 which is mounted on bars 20. A bearing block 21 which may be secured to bars 22 serves to rotatably support the upper end of the shaft 18. A means is provided for causing rotation of the shaft 18 as the water circulates through the system, and this means comprises a body member 23 which has a cylindrical hub 26 secured to the shaft 18. The body member 23 further includes inclined surfaces 24 against which the water and fish impinge, and a plurality of vanes 25 extend radially or angularly from the body member 23 and are secured thereto. The fish and water are elevated to the top of the housing 10 by means of a conduit 27, and as the fish and water strike the inclined surfaces 24 and the vanes 25, the body member 23 will be caused to rotate and this in turn will cause rotation of the shaft 18. A means is provided for preventing the filter 14 and discharge spout 9 from becoming clogged with fish, and this means comprises a plurality of vanes or blades 28 which are secured to the lower portion of the shaft 18, Figure 1. Thus, as the shaft 18 is rotated by means of the body member 23, the blades 28 will rotate to thereby keep the fish moving through the filter.

Positioned below the housing 10 is a base 29, and supported on the base 29 is a pump 30. The pump 30 includes a cylindrical casing 31 which is hollow, and the conduit 27 leads from the pump 30 to the top of the housing. Rotatably mounted in the casing 31 is a disc 32, and extending into the casing 31 and secured to the disc 32 is a shaft 33. A pulley 34 is mounted on the outer end of the shaft 33, and the pulley 34 can be connected to any suitable power source such as a belt driven by a gasoline engine or an electric motor. Thus, as the shaft 33 rotates, the disc 32 will rotate whereby there will be a resulting rotation of the plurality of curved blades or vanes 35 which are secured to the disc 32. Since the vanes 35 are curved, the fish being pumped up through the conduit 27 will not be damaged during their movement.

For supplying the water and fish to the pump 30, a conduit 36 is connected to the casing 31, and a cap or lid 37 is connected to the conduit 36 by bolt and nut assemblies 38. By loosening the bolt and nut assemblies 38, the lid 37 can be removed as when the conduit 36 is to be cleaned out.

There is further provided a valve assembly which is indicated by the numeral 39, and the valve assembly 39 includes a housing or casing 40. A conduit 41 leads from the housing 40 to the priming chamber 7 which has water therein as shown in Figure 1. A conduit or pipe 42 is connected to the casing 40, and the conduit 42 serves to act as a suction line so that the fish and water may be sucked up from a fish net or the like by means of the suction created by the pump 30. The casing 40 may be supported on legs 43. Part of the water passing down through the filter 14 will pass down through the reticulated bottom wall 8 and into the priming chamber 7, while the remaining portion of the water will fall to the bottom of the housing 10 on the wall 11 and this remaining water is discharged through a suitable outlet conduit or pipe 44, Figure 3. The water from the conduit 44 can be discharged into any suitable locality, as for example this water can be returned to the sea.

The structure of the valve assembly 39 is shown in detail in Figures 5 and 6. Thus, secured in the casing 40 is a pair of cylindrical sleeves 45 and 46 which are arranged angularly with respect to each other. Each of these sleeves may have an annular flange 47 secured thereto in any suitable manner, as for example by welding, and each of the flanges 47 may be provided with apertures 48 whereby suitable securing elements such as bolt and nut assemblies 49 can be extended through these apertures 48 and through registering apertures in corresponding flanges on the conduits 41 and 42.

The ends of the sleeve 45 are open, and the ends of the sleeve 46 are also open. A disc or valve member 50 is mounted for movement into and out of closing relation with respect to the inner end of the sleeve 45, and a similar valve or disc 51 is mounted for movement into and out of bridging or closing relation with respect to the inner end of the sleeve 46. Secured to each of the discs 50 and 51 are lugs 52 which have a pin 54 extending therebetween. Bars 53 extend from the pins 54, and the bars 53 have cylindrical collars 55 secured to their inner ends. The collars 55 are rotatably mounted on a cylindrical arm or axle 56.

A manually operable means is provided for limiting opening movement of the disc 50 or 51, and this means comprises a lock bar or bracket 57 which extends outwardly from a tube 58 and is secured thereto in any suitable manner. The tube 58 is secured to the arm 56, so that as the arm 56 rotates the tube 58 will rotate therewith. A manually operable lever 59 is movably mounted outside of the valve assembly 39, and the lever 59 is secured to an end of the arm 56. A spring pressed detent 60 is carried by the lever 59, and the detent 60 is mounted for movement into and out of engagement with teeth 61 on a curved sector plate 62. Thus, by manually shifting or moving the lever 59, the arm 56 will be rotated and this in turn will cause rotation of the tube 58 and lock bar 57. Thus, the lock bar 57 can be positioned at any desired position with respect to the disc 50 or disc 51 so that these members can be maintained in fully closed position or in partially open position. The detent 60 can be manually released, and the detent 60 engages the teeth 61 to maintain the lever 59 and lock bar 57 immobile in its various adjusted positions.

From the foregoing it is apparent that there has been provided a pumping assembly which is especially suitable for use in elevating fish from a net or the like. In use the lower end of the conduit 42 can be arranged in engagement with the net or other container having fish therein, and then the pump is actuated by means of power supplied to the pulley 34. As the disc 32 and blade 35 of the pump rotate, the fish and water will be sucked up through the conduit 42, and the disc 51 will open or move away from the sleeve 46 so that the fish and water will enter the lower portion of the casing 40 and then pass through the conduit 36 and into the pump 30. The rotating curved blades 35 will cause the fish and water to be moved up through the conduit 27 to the top of the housing 10 and the fish and water will fall onto the body member 23 and cause rotation of the body member 23. The fish and water will then pass down through the filter 14 and since the body member 23 is rotating constantly, the shaft 18 will rotate to thereby cause rotation of the vanes 28 which will prevent the filter or discharge spout 9 from becoming clogged with fish. Part of the water passing down through the reticulated bottom 8 will enter the priming chamber 7, while the remaining water will pass down onto the bottom wall 11 and out through the discharge conduit 44. The fish are collected in the discharge spout 9 and pass out the open end thereof, Figure 2, whereby they can be collected in any suitable receptacle. When the conduit 42 is moved from place to place, as for example when it is lifted out of the water so that it can be moved from one net to another, the pump 30 will not suck air or run dry due to the provision of the priming chamber 7. Thus, it will be seen that the priming chamber 7 is normally filled with water as shown in Figure 1, and as the conduit 42 is to be shifted or raised out of the water, the lever 59 can be pivoted to move the lock bar 57 against the disc 51 to prevent opening of this disc. Then, the disc 50 will be able to open or move away from the sleeve 45 so that the water from the priming chamber 7 will be sucked through the conduit 41 and then through the sleeve 45, and then through the conduit 36 into the pump 30 so that the pump will not run dry. After the conduit 42 has been positioned in the next net to be emptied, the lever 59 and lock bar 57 can again be positioned against the disc 50 so that the disc 50 cannot open but the disc 51 can open so that fish and water will be sucked up through the conduit 42.

The curved blades 35 push the fish up through the conduit 27. Each of the discs 50 and 51 may be backed up by a rigid plate or plates to reinforce the discs. The valve assembly 39 prevents the pump 30 from sucking in air since water will flow through the pump 30 at all times. Thus, the fish will not be damaged or torn since water will always be present in the system, even when the hose 42 is out of the water. Excess water from the outlet 44 can drain back into the sea and if desired the fish elevating assembly of the present invention can be mounted on the deck of a boat and the pump can be operated continuously and will not have to be stopped when the conduit 42 is moved from place to place.

The shaft 56 is of solid construction and extends through a stuffing box and through the valve housing. The two valves on the shaft 56 have gaskets which are separate and float or swing by the pressure of water, or by suction of the pump. The valves can be held open or closed for priming or for pumping fish by means of the lock bar 57 which is connected to the shaft.

I claim:

1. In combination, a plurality of vertically disposed spaced parallel legs, a hollow housing supported by said legs and including a horizontally disposed bottom wall, a lid mounted on top of said housing, a vertically disposed shaft rotatably supported in the upper portion of said housing, a body member secured to the top of said shaft and including a plurality of angularly arranged vanes, a reticulated filter supported in the upper portion of said housing and surrounding said shaft, a spout extending from said filter and projecting through said housing for the discharge therethrough of fish, blades secured to said shaft below said body member for preventing the fish from clogging the spout and filter, a pump positioned below said housing, a first conduit extending between said pump and the top of said housing, a second conduit connected to the lower end of said housing for the egress therethrough of fluid, a valve assembly spaced from said pump and including a housing having sleeves secured therein, discs mounted for movement into and out closing relation with respect to said sleeves, manually operable means for limiting opening movement of said disc, there being a chamber in the bottom of said housing for receiving a part of the liquid from said filter, a third conduit connecting said chamber to said valve assembly, a fourth conduit connecting said valve assembly to said pump, a plate detachably connected to said fourth conduit for permitting access thereto, and a suction intake conduit connected to said valve assembly, said sleeves extending through a portion of said housing and connecting respectively with said third conduit and said suction intake conduit.

2. In combination, a plurality of vertically disposed spaced parallel legs, a hollow housing supported by said legs and including a horizontally disposed bottom wall, a lid mounted on top of said housing, a vertically disposed shaft rotatably supported in the upper portion of said housing, a body member secured to the top of said shaft and including a plurality of angularly arranged vanes, a reticulated filter supported in the upper portion of said housing and surrounding said shaft, a spout extending from said filter and projecting through said housing for the discharge therethrough of fish, blades secured to said shaft below said body member for preventing clogging of the discharge spout and filter, a pump positioned below said housing, a first conduit extending between said pump and the top of said housing, a second conduit connected to the lower end of said housing for the egress therethrough of fluid, a valve assembly spaced from said pump, there being a chamber in the bottom of said housing for receiving a part of the liquid from said filter, a third conduit connecting said chamber to said valve assembly, a fourth conduit connecting said valve assembly to said pump, a suction intake conduit connected to said valve assembly, said pump including a casing, a disc rotatably mounted in said casing, a plurality of curved vanes secured to said disc, a drive shaft extending into said casing and secured to said disc, a pulley mounted on said drive shaft, a plate detachably connected to said fourth conduit for permitting access thereto, said valve assembly comprising a housing, a pair of angularly arranged sleeves secured in said housing, said sleeves extending through a portion of said valve housing and connecting respectively with the conduit extending through the chamber and the suction inlet conduit, a disc mounted for movement into and out of closing relation with respect to each of said sleeves, a stop bar for limiting opening movement of said disc, and a manually operable lever for moving said stop bar.

3. In a fish pump assembly, a hollow housing, a filter mounted in said housing, a discharge spout connected to the lower end of said filter for the passage therethrough of fish, an outlet conduit connected to the lower end of said housing for the egress therethrough of water, a priming chamber arranged in the lower end of said housing, a pump positioned below said housing and adapted to be connected to a source of power, a conduit connecting said pump to the top of said housing, a valve assembly spaced from said pump and including an inlet suction hose, said valve assembly further including a housing having sleeves secured therein, discs mounted for movement into and out of closing relation with respect to said sleeves, manually operable means for limiting opening movement of said discs, a conduit connecting said valve assembly to said pump, and a conduit connecting said valve assembly to said priming chamber, said sleeves extending through a portion of the housing and connecting respectively with the conduit extending through the priming chamber and the inlet suction hose.

References Cited in the file of this patent

UNITED STATES PATENTS

| | | |
|---|---|---|
| 804,774 | Shepard | Nov. 14, 1905 |
| 2,078,235 | Chapman | Apr. 27, 1937 |
| 2,396,305 | Toft | Mar. 12, 1946 |